United States Patent
Rueger

[11] Patent Number: 6,104,026
[45] Date of Patent: Aug. 15, 2000

[54] SYSTEM FOR PARALLELIZING THE AXES OF A THERMAL IMAGE APPARATUS

[75] Inventor: Roderich Rueger, Munich, Germany

[73] Assignee: LFK Lenkflugkoerpersysteme GmbH, Munich, Germany

[21] Appl. No.: 09/079,237

[22] Filed: May 15, 1998

[30] Foreign Application Priority Data

May 17, 1997 [DE] Germany .............. 197 20 903

[51] Int. Cl.[7] .......................................... G01J 5/00
[52] U.S. Cl. ......................... 250/252.1; 250/347
[58] Field of Search .............. 250/252.1 A, 347

[56] References Cited

U.S. PATENT DOCUMENTS

| | | | |
|---|---|---|---|
| 4,087,689 | 5/1978 | Asawa | 250/342 |
| 4,649,274 | 3/1987 | Hartmann | 250/341.5 |
| 5,534,696 | 7/1996 | Johansson et al. | 250/330 |

FOREIGN PATENT DOCUMENTS 63-150606   6/1988   Japan ........................ 250/252.1 A

*Primary Examiner*—Constantine Hannaher
*Attorney, Agent, or Firm*—Evenson, McKeown, Edwards & Lenahan, P.L.L.C.

[57] ABSTRACT

In a system for parallel alignment of the axes of a thermal image apparatus, the IR beam path and the visual beam path extend along the same optical elements. A luminous point/four-quadrant sensor unit which in itself is adjusted with precise and stable axes, is assigned to the IR radiation and visual radiation in front of the display (LCD); and an imaging arm which can be swivelled into the IR beam path or is stationary and has a ridge mirror and a plane mirror, or only a beam splitter, is arranged in front of the viewing lens system.

8 Claims, 5 Drawing Sheets

SYSTEM FOR PARALLELIZING THE AXES OF A THERMAL IMAGE APPARATUS

BACKGROUND AND SUMMARY OF THE INVENTION

This application claims the priority of German patent document 197 20 903.3, filed May 17, 1997, the disclosure of which is expressly incorporated by reference herein.

The invention relates to a system for parallel alignment of the axes of a thermal image apparatus.

The guidance of missiles is normally coordinated with the graticule of a telescope through which the launcher sights the target. If a nightviewer is added to the launching system, its optical axis must be parallel to that of the telescope, as defined by the graticule. The required precision of typically 0.1 mrad is very difficult to set mechanically and, under military environmental conditions, is even more difficult.

It is known simply to equip the nightviewer with magnification, and to position it as an attachment in front of the telescope in order to use the graticule of the telescope also in night operations. However, this process requires that, in the nightviewer, the IR input axis and the visible output axis are disposed in parallel within <0.1 mrad, and remain so. An embodiment of this state of the art is illustrated in FIG. 2. The IR beam path and the visible beam path extend largely along the same optical elements so that relative axis drifts of the components are eliminated. The mirror M7 and the beam splitter D3 must be disposed stably relative to one another, but may drift jointly. By means of such an arrangement, the parallel alignment of the axes is held within 0.1 mrad in a limited temperature range, at considerable expenditures.

Furthermore, in the arrangement of FIG. 2, the thermal image apparatus must be designed specifically for this application. Thus, it is not possible to use one of the many available observation nightviewers. Also, modern nightviewers have a monitor or an LCD as a display and no longer have LED's which can be utilized only in a precise IR detector configuration and number of detectors. However, it is known that these furnish only relatively dark images. The utilization of joint beam paths in the IR band and in the visual band is therefore no longer possible.

It is an object of the present invention to provide a system of the above-mentioned type in which the IR input axis is fully automatically aligned in parallel with to the visual output axis of the thermal image apparatus, also for nightviewers which are conceived only for observation purposes.

This and other objects and advantages are achieved by the alignment system according to the invention in which the IR beam path and the visible beam path extend along the same optical elements. A luminous point/four-quadrant sensor unit which is adjusted with precise and stable axes, is assigned to the IR radiation and visual radiation in front of the display (LCD); and an imaging arm, which can be swivelled into the IR beam path or is stationary and has a ridge mirror and a plane mirror, or only a beam splitter, is arranged in front of the viewing lens system.

Other objects, advantages and novel features of the present invention will become apparent from the following detailed description of the invention when considered in conjunction with the accompanying drawings.

DETAILED DESCRIPTION OF THE DRAWINGS

Figure 1:
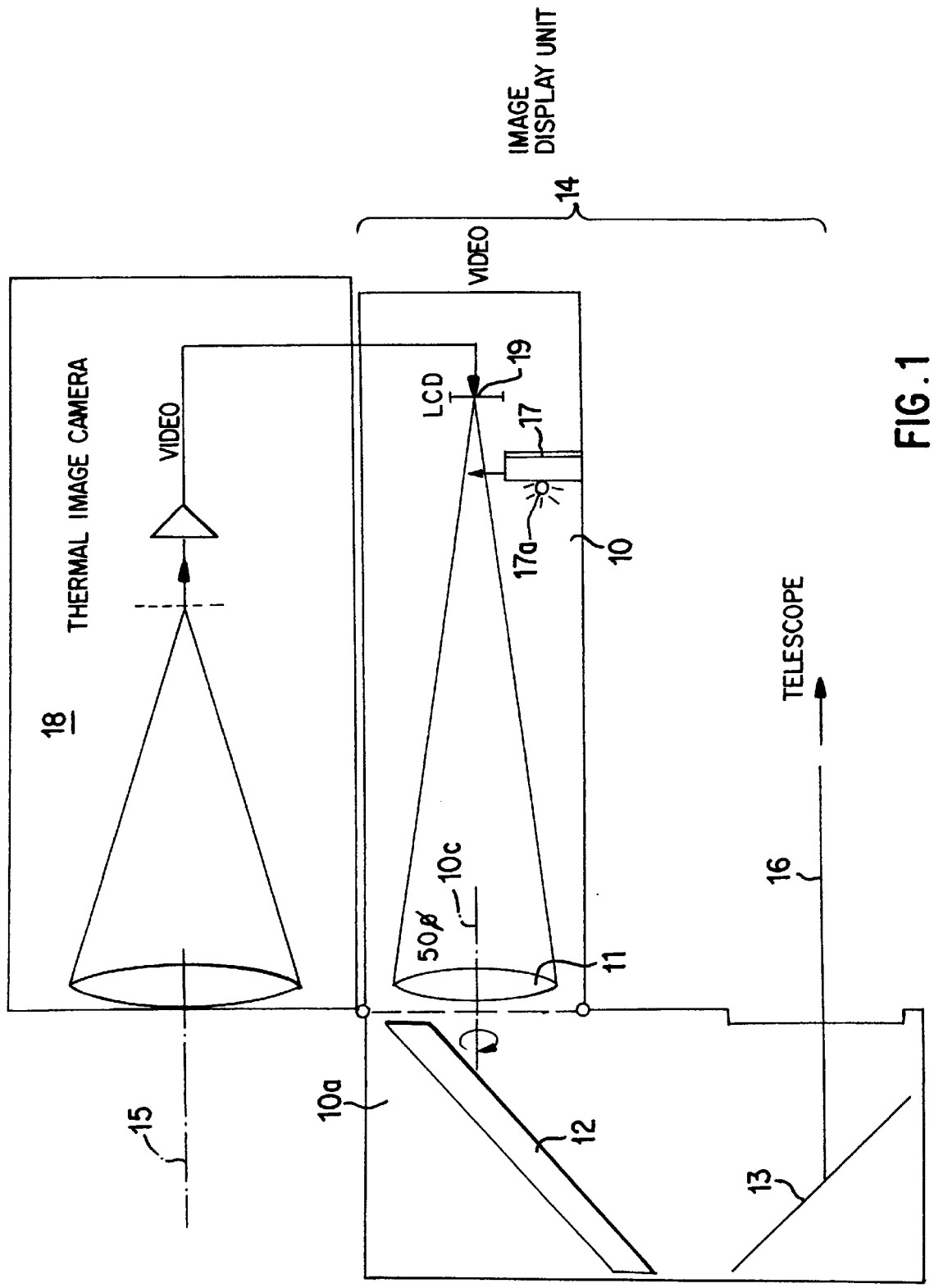
FIG. 1 is a view of an embodiment of the complete thermal image apparatus according to the invention.

As illustrated schematically in FIG. 1, the viewing lens system 11 and the LCD or CRT display 19 are installed into a stable tube 10. An imaging arm 10a, which is equipped with a ridge mirror 12 and a plane mirror 13, is situated in front of the imagining lens system 11. Small movements of this mirror arm 10a do not influence the direction of the visible beam path (triple mirror).

Figure 2:
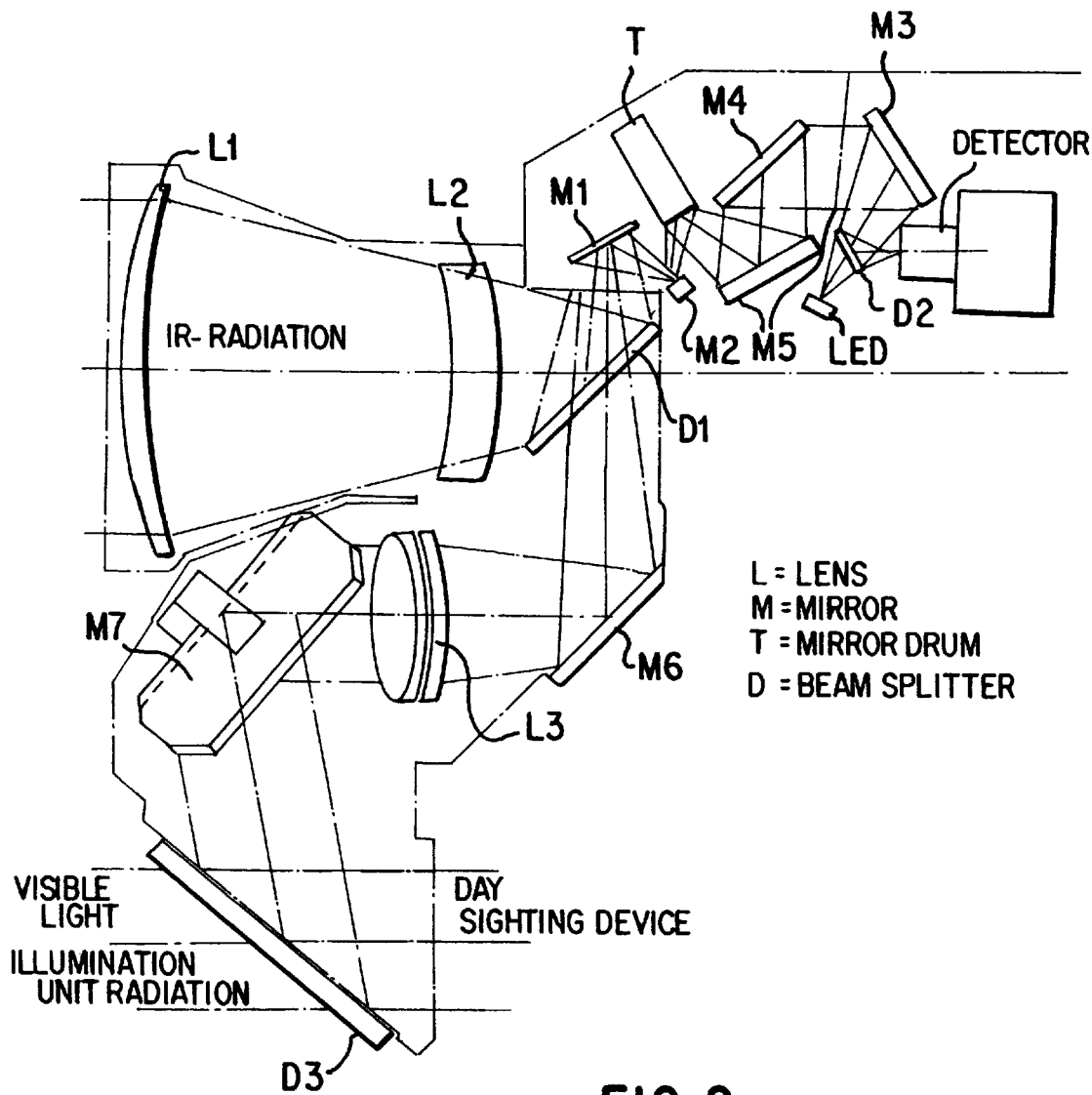
FIG. 2 depicts an embodiment of the state of the art.

In principle, any thermal image observation camera 18 with a video signal output can be placed on the image display unit 14. In such a modular nightviewer construction, the parallel alignment of the IR axis 15 with the visible axis 16 is even more difficult to meet than in an apparatus according to FIG. 2.

Figure 4:
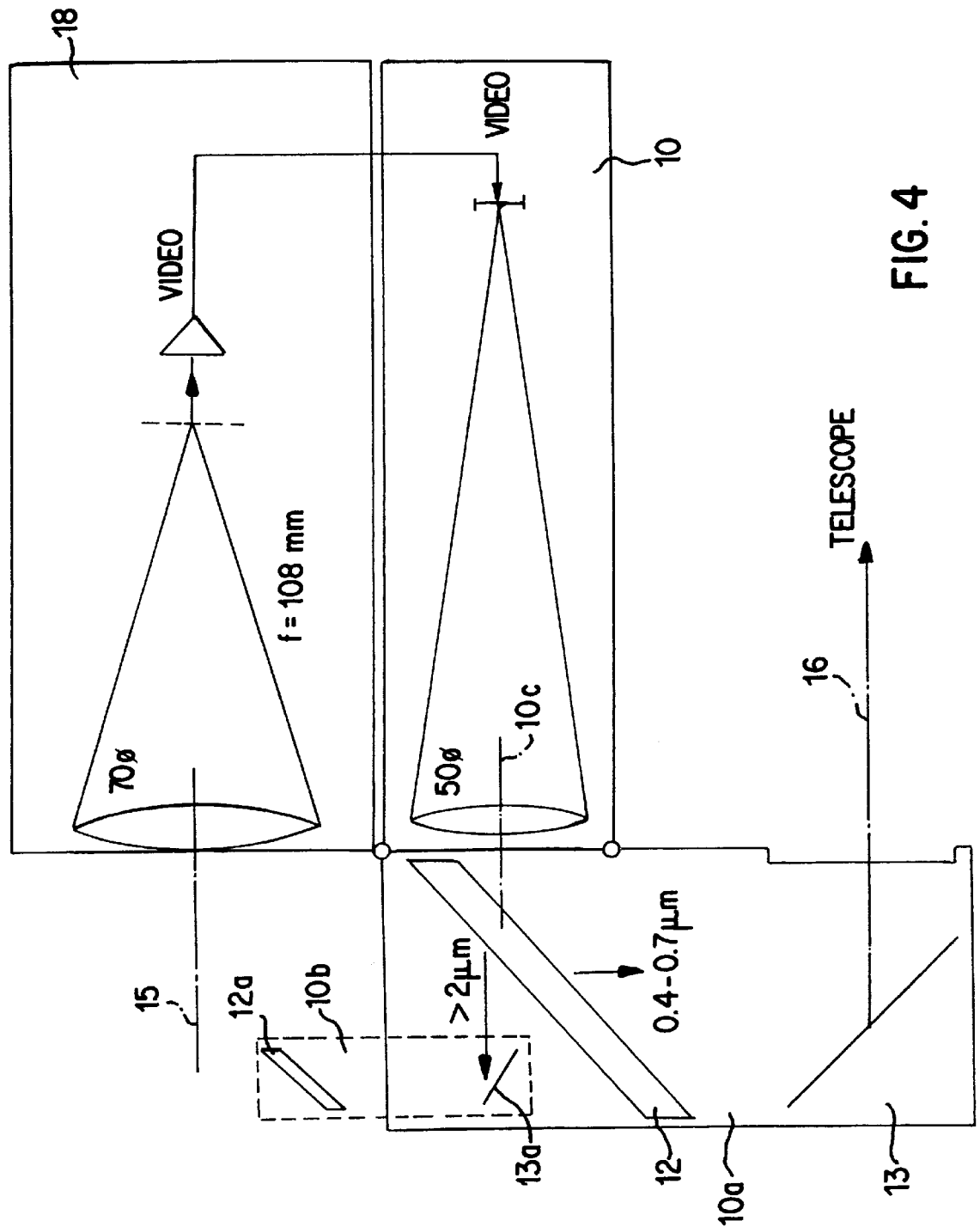
FIG. 4 is a view of an embodiment of the complete thermal image apparatus according to the invention, with a second imaging arm.
Figure 5:
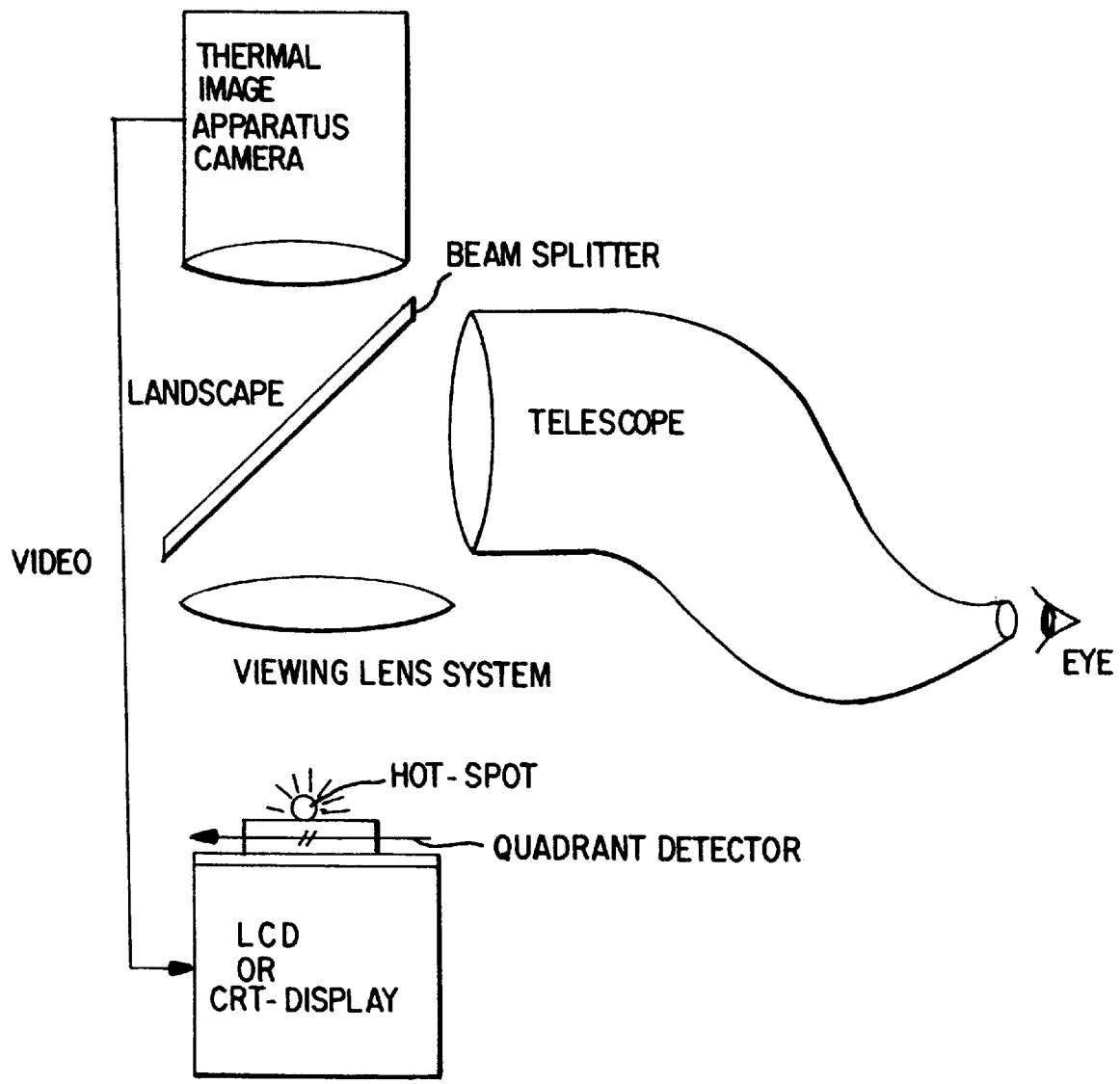
FIG. 5 is a view of an embodiment of the complete thermal image apparatus according to the invention, in an arrangement with a beam splitter.

The invention assures parallel alignment of the IR axis 15 with respect to the visible axis 16 as follows: in the arrangement illustrated in FIG. 3 the imaging arm 10a is shown rotated by 180° about a rotational axis 10c (or alternatively according to the embodiment of FIG. 4, for beam splitting a second imaging arm 10b is provided, or an arrangement according to FIG. 5 is provided). A four-quadrant sensor 17 having a luminous point 17a is placed in front of the display 19 (LCD or CRT). The position of the luminous point 17a is exactly and fixedly adjusted with respect to the center of the four-quadrant sensor 17.

With the four-quadrant sensor/luminous point 17a thus positioned in the optical path, the nightviewer (thermal imaging camera 18) detects the luminous point 17a via the invariant mirror arm 10a and outputs a signal indicative of its position to the display 19. The four quadrant sensor 17 senses the location of the image of the luminous point 17a in the display 19, which is then adjusted on the display 19 (in the case of a monitor, by changing the deflecting voltages) until it is situated in the center of the four-quadrant sensor 17. As demonstrated by experimental examinations, the precision of the parallel axis alignment of IR to the visual amounts to approximately 50 µrad.

No lens system is required for focussing the luminous point 17a of the display on the four-quadrant sensor 17. Rather, it is sufficient to position the sensor 17 approximately 2 to 5 mm in front of the display. Also, no lens system is required in front of the luminous point 17a to improve its focus, since it is situated slightly outside the focal plane of the viewing lens system. The position of the "luminous point 17a and fours quadrant sensor 17" unit in front of the display has no influence on the axis alignment.

A small luminous point 17a can also be positioned at the image contour, so that and the parallel axis alignment can therefore be continuously tested and, if necessary, corrected. When a mirror arm is swivelled in for the purpose of axis alignment, it is expedient for the "luminous point/four-quadrant sensor" unit 17/17a also to be swivelled approximately into the image center. The axis alignment takes place fully automatically during approximately 10 images—that is, for approximately 200 ms. Since the four-quadrant sensor need sense only the direction of displacement of the image from the zero position, the absolute values of the amount of deviation are not important.

The spectral range of the IR camera and of the image display 14 must overlap at least in a narrow range. In the case of 3 to 5 μm thermal image devices, the detector is still sensitive at 1 to 2 μm. In this case, a normal glass lens system may also be used for the image display.

For thermal image devices in the spectral range of from 8 to 12 μm, the luminous point 17a must also be imaged in this spectral range. Here, the image display lens system must be at least partially transparent also in the spectral range of from 8 to 12 μm. This is achieved by using, for example, Cleartran, BaF or glass of a mirror lens system.

By means of the arrangement described above all axis errors are automatically detected and corrected in the whole nightviewer. The only component which must have precise and stable axes is the small compact "luminous point/four-quadrant sensor" unit 17a, 17. The use of an expensive four-quadrant detector for measuring the axis parallelism and for initiating corrections, optimizes the efficiency. The position of the unit 17, 17a does not affect the measurement of the axis parallelism; therefore, it need not be positioned exactly.

FIG. 5 illustrates an embodiment which has no imaging arm. Rather, a beam splitter 20 permits fully automatic parallel axis alignment by means of the unit 17, 17a in front of the display. The thermal image camera 18 looks into the landscape by way of the beam splitter, as does the telescope. Point 17a is seen by the thermal image camera 18 through the beam splitter 20, is imaged on the display and detected by the four-quadrant detector 17. Deviations of the displayed image from the detector center are corrected to zero by displacing the image on the display. The display is viewed from the back of the beam splitter 20 via the telescope. (Slight) movements of the beam splitter 20 do not influence the parallel alignment of the IR axis of the thermal image apparatus 18 with the axis of the telescope since the beam splitter is used from the front and the back side, and thus parallelism of the IR axis and the visual axis is not influenced.

Figure 3:
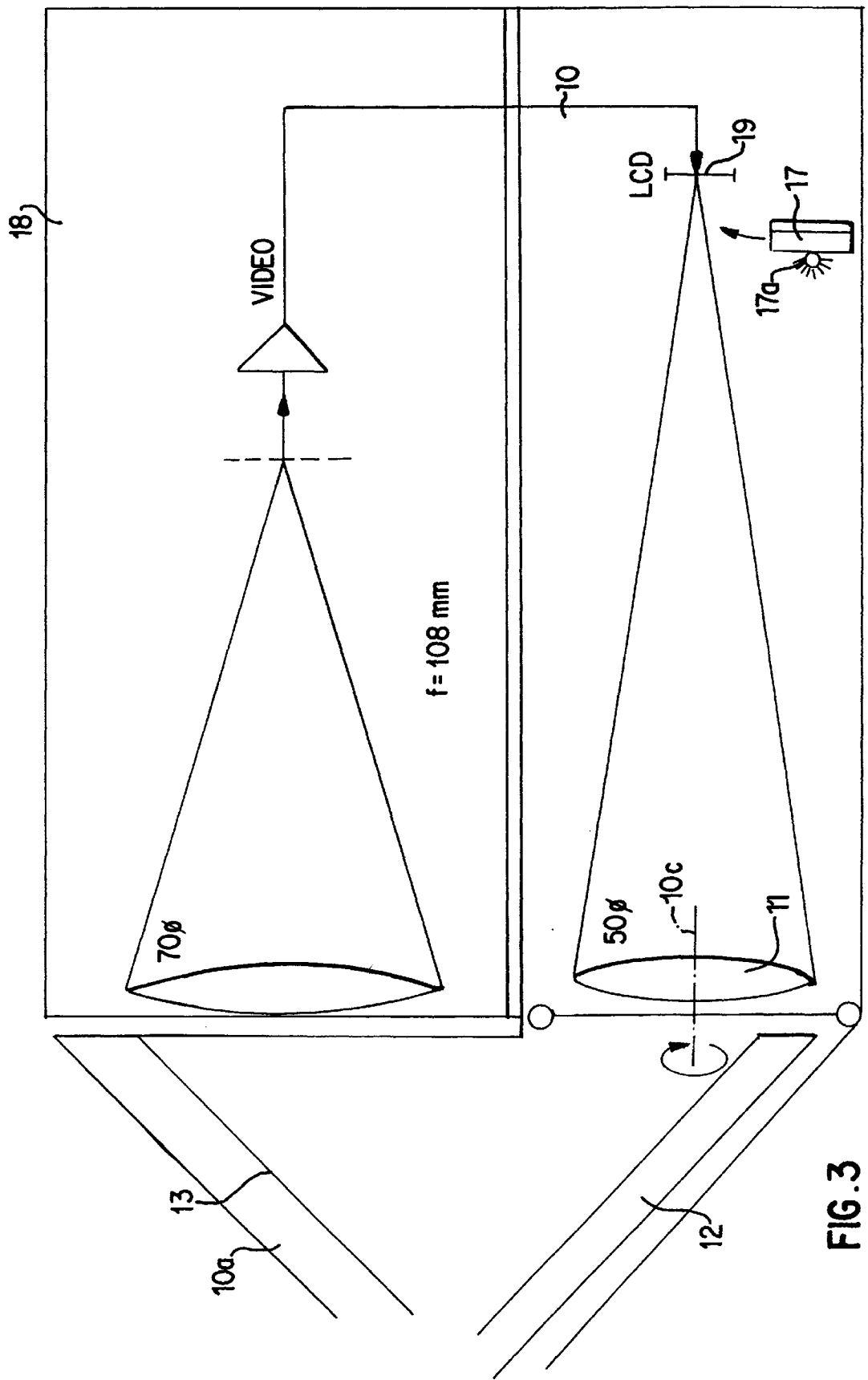
FIG. 3 is a view of an embodiment according to FIG. 1 having an imaging arm which is rotated by 180° in regard to the axis alignment.

In front of the display 17, a bar pattern can be entered in all arrangements according to FIG. 3, 4 or 5. A small correcting lens is situated on the bar pattern because the bar pattern is situated in front of the focal plane. Thus, it is possible to test the resolving capacity (MRT=min. resolvable temperature difference) of the thermal image apparatus. Normally, a large external collimator is required for the MRT measurement.

The embodiment according to FIG. 5 also makes it possible to reduce aliasing of advanced thermal image apparatus (staring array) in a very simple manner. The beam divider folds in a frame timing sequence (20 msec) back and forth by half a line advance. As a result, the image is displaced in the landscape as well as in the telescope by half a line amplitude from one frame to the next. The sample interval is therefore cut in half (sampling rate is doubled) and aliasing is therefore reduced, without any intervention in the camera or in the display.

In staring array thermal image devices, there are always some identical detector elements. When the beam splitter is tipped in the frame timing sequence n+½ line advance (n=a small integer), the defective pixels in the two frames are situated at different image points and are therefore disturbed less.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. System for aligning axes of a thermal image apparatus, having an IR beam path defined by a thermal imaging camera and a visual beam path extending along the same optical elements as the IR beam path, comprising:
   an image display unit;
   four-quadrant sensor unit having a luminous point fixedly associated therewith, which luminous point is adjusted with precise and stable axes, relative to the four-quadrant sensor, which sensor is assigned to IR radiation and visual radiation, and is arranged in front of the image display unit; and
   an imaging arm, which has a ridge mirror and a plane mirror.

2. System according to claim 1 wherein said imaging arm is stationary.

3. System according to claim 1 wherein said imaging arm is swivellable into and out of the IR beam path.

4. System according to claim 1 wherein centers of the luminous point and of the four-quadrant sensor are congruent.

5. System according to claim 1 wherein spectral ranges of the thermal imaging camera and of the image display overlap at least in part.

6. System according to claim 1 wherein deviation signals from the four-quadrant sensor are provided for displacing the image position of the display.

7. System according to claim 1 further comprising:
   a thermal beam pattern having a correcting lens which can be entered in front of a focal plane of the display, or a beam splitter can be tipped between the thermal imaging camera and the display in the frame timing sequence approximately half a thermal image apparatus line amplitude.

8. System for aligning axes of a thermal image apparatus, having an IR beam path defined by a thermal imaging camera and a visual beam path extending along the same optical elements as the IR beam path, comprising:
   an image display unit;
   four-quadrant sensor unit having a luminous point fixedly associated therewith, which luminous point is adjusted with precise and stable axes, relative to the four-quadrant sensor, which sensor is assigned to IR radiation and visual radiation, and is arranged in front of the image display unit; and
   a beam splitter arranged in front of a viewing lens system.

* * * * *